United States Patent
Choi et al.

(10) Patent No.: US 10,037,256 B2
(45) Date of Patent: Jul. 31, 2018

(54) ELECTRONIC DEVICE HAVING SELF DIAGNOSIS FUNCTION AND SELF DIAGNOSIS METHOD USING THE SAME

(71) Applicant: SAMSUNG ELECTRONICS CO., LTD., Suwon-si (KR)

(72) Inventors: Young-hun Choi, Hwaseong-si (KR); Hyun-ho Kim, Seoul, KS (US); Sang-eun Lee, Seoul (KR); Ju-hyun Choe, Hwaseong-si (KR); Eun-young Kim, Seoul (KR); Ji-won Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 702 days.

(21) Appl. No.: 14/018,615

(22) Filed: Sep. 5, 2013

(65) Prior Publication Data

US 2014/0068332 A1 Mar. 6, 2014

(30) Foreign Application Priority Data

Sep. 5, 2012 (KR) .................. 10-2012-0098397

(51) Int. Cl.
*G06F 11/27* (2006.01)
*G05B 23/02* (2006.01)
(Continued)

(52) U.S. Cl.
CPC .......... *G06F 11/24* (2013.01); *G05B 23/0256* (2013.01); *G06F 11/221* (2013.01);
(Continued)

(58) Field of Classification Search
CPC ... G05B 23/0256; G06F 11/221; G06F 11/27; G09G 3/006; G09G 5/006
(Continued)

(56) References Cited

U.S. PATENT DOCUMENTS 7,130,791 B2 * 10/2006 Ko ..................... G06F 3/04897
704/3
2002/0133649 A1 * 9/2002 Chu ..................... G06F 13/426
710/62
(Continued)

FOREIGN PATENT DOCUMENTS

CN 1466370 A 1/2004
CN 102112914 A 6/2011
(Continued)

OTHER PUBLICATIONS

Communication from the European Patent Office issued Dec. 5, 2013 in a counterpart European Application No. 13174002.9.
(Continued)

*Primary Examiner* — Michael Nghiem
*Assistant Examiner* — Peter Ngo
(74) *Attorney, Agent, or Firm* — Sughrue Mion, PLLC (57) ABSTRACT

An electronic device which has a self diagnosis function and a self diagnosis method using the same are provided. The electronic device includes: an interface which receives a user's selection signal for a hardware of an object to be diagnosed; and a controller which provides a plurality of lines connected to the hardware of the object to be diagnosed with a signal for diagnosis according to the selection signal which is received through the interface and calculates a diagnosis result for the hardware of diagnosis object according to a comparison result of the signal for diagnosis with a return signal which is returned from the hardware of the object to be diagnosed by a loop-back.

17 Claims, 7 Drawing Sheets

(51) Int. Cl.
*G06F 11/22* (2006.01)
*G09G 3/00* (2006.01)
*G09G 5/00* (2006.01)
*G06F 11/24* (2006.01)

(52) U.S. Cl.
CPC ............ *G09G 3/006* (2013.01); *G09G 5/006* (2013.01); *G09G 2320/0693* (2013.01); *G09G 2330/12* (2013.01)

(58) Field of Classification Search
USPC .......................................... 702/183; 714/30
See application file for complete search history.

(56) References Cited

U.S. PATENT DOCUMENTS

| | | | |
|---|---|---|---|
| 2003/0227653 | A1 | 12/2003 | Jeong |
| 2005/0268175 | A1* | 12/2005 | Park .................. G06F 11/2221 714/43 |
| 2006/0107154 | A1 | 5/2006 | Bansal et al. |
| 2006/0176943 | A1 | 8/2006 | Sindalovsky et al. |
| 2007/0079284 | A1* | 4/2007 | Kim .................. G06F 17/30572 717/113 |
| 2007/0104111 | A1* | 5/2007 | Kakizawa ............ G01R 31/316 370/249 |
| 2007/0121711 | A1 | 5/2007 | Offord et al. |
| 2008/0126001 | A1* | 5/2008 | Murray .................. G06F 11/27 702/119 |
| 2008/0239082 | A1* | 10/2008 | Zhu .................. G01R 31/3167 348/181 |
| 2009/0213913 | A1 | 8/2009 | Farmer et al. |
| 2011/0110412 | A1* | 5/2011 | Shin .................... H04L 25/0272 375/224 |
| 2011/0175800 | A1* | 7/2011 | Mizumaki .............. G09G 3/006 345/87 |
| 2012/0079330 | A1 | 3/2012 | Kawaguchi et al. |
| 2012/0191400 | A1* | 7/2012 | Sontakke ......... G01R 31/31724 702/119 |

FOREIGN PATENT DOCUMENTS

| | | |
|---|---|---|
| JP | 2011-226917 A | 11/2011 |
| KR | 10-0402348 B1 | 10/2003 |
| KR | 10-2007-0121881 A | 12/2007 |
| KR | 10-2008-0003404 A | 1/2008 |
| KR | 10-2008-0005224 A | 1/2008 |

OTHER PUBLICATIONS

Communication dated Sep. 9, 2016, from the State Intellectual Property Office of People's Republic of China in counterpart Application No. 201310399873.X.

Communication dated Apr. 14, 2017, issued by the State Intellectual Property Office of People's Republic of China in counterpart Chinese Patent Application No. 201310399873.X.

Communication dated Jun. 20, 2017, issued by the European Patent Office in counterpart European Patent Application No. 13174002.9.

Communication issued May 14, 2018, issued by the Korean Intellectual Property Office in counterpart Korean Patent Application No. Oct. 2012-0098397 Y.

* cited by examiner

ELECTRONIC DEVICE HAVING SELF DIAGNOSIS FUNCTION AND SELF DIAGNOSIS METHOD USING THE SAME

CROSS-REFERENCE TO RELATED APPLICATION

This application claims priority from Korean Patent Application No. 10-2012-0098397, filed on Sep. 5, 2012 in the Korean Intellectual Property Office, the disclosure of which is incorporated herein by reference.

BACKGROUND

Field

Apparatuses and methods consistent with the exemplary embodiments relate to an electronic device, and more particularly to an electronic device having a self diagnosis function and a self diagnosis method using the same.

Description of the Related Art

An inspection of the performance of a component of an electronic device, or an inspection of a signal line for the sending/receiving of signals to/from the electronic device is carried out by watching a screen which is connected to an external device during a manufacturing process.

For example, an inspection of the port of a High Definition Multimedia Interface (HDMI) is carried out by several external devices or distributors and a HDMI cable.

Thus, it takes a long time to inspect each port because the inspection is carried out in consecutive order, and a consumer is unable to inspect the port by himself. Accordingly, there is a need for a system which allows an electronic device to perform a self-diagnosis operation easily.

SUMMARY

Accordingly, one or more exemplary embodiments may provide an electronic device having a self diagnosis function and a self diagnosis method using the same which carries out a self diagnosis operation without inserting an external device into the electronic device or without an external input device.

One or more exemplary embodiments may provide an electronic device having a self diagnosis function and a self diagnosis method using the same which shortens an inspection time for manufacturing of an electronic device.

One or more exemplary embodiments may provide an electronic device having a self diagnosis function and a self diagnosis method using the same which helps a consumer to conveniently inspect an electronic device by himself.

One or more exemplary embodiments may provide an electronic device having a self diagnosis function and a self diagnosis method using the same which carry out a self diagnosis method using a loop-back operation.

The foregoing and/or other aspects may be achieved by providing an electronic device including an interface configured to receive a user's selection signal for a hardware of an object to be diagnosed; and a controller configured to provide a plurality of lines connected to the hardware of the object to be diagnosed with a signal for diagnosis according to a selection signal which is received through the interface, and calculate a diagnosis result for the hardware of the object to be diagnosed according to a comparison result of the signal for diagnosis with a return signal which is returned from the hardware of the object to be diagnosed by a loop-back operation.

According to an aspect of another exemplary embodiment, the signal for diagnosis may have a DC voltage or a frequency which is provided to the lines.

According to an aspect of another exemplary embodiment, the signal for diagnosis may have different values for each line of the plurality of lines.

According to an aspect of another exemplary embodiment, the diagnosis about the lines may be not in consecutive order but in simultaneous order.

According to an aspect of another exemplary embodiment, the controller may show the diagnosis result on an On Screen Display (OSD).

According to an aspect of another exemplary embodiment, the hardware of the object to be diagnosed may be a connector having a port which is connected to an external device and the connector may form a loop-back by a cap applying an electric current.

According to an aspect of another exemplary embodiment, the connector may be a connector of a Universal Serial Bus (USB) interface or an HDMI.

According to an aspect of another exemplary embodiment, the electronic device may further include a memory which has information of a diagnosis period for the hardware of the object to be diagnosed.

According to an aspect of another exemplary embodiment, the diagnosis period may be determined by a user or set in advance.

The foregoing and/or other aspects may be achieved by providing a self diagnosis method for an electronic device, the method including displaying an instruction screen for the self diagnosis operation; receiving a selection signal for a hardware of the object to be diagnosed from a user; providing a plurality of lines connected to the hardware of the object to be diagnosed with a signal for diagnosis; receiving a return signal from the hardware of the object to be diagnosed by a loop-back operation; comparing the return signal with the signal for diagnosis; calculating a diagnosis result for the hardware of the object to be diagnosed according to the comparison result; and displaying the diagnosis result.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, "an electronic device" means an electronic product which has a plurality of components. Exemplary embodiments will be described in detail with reference to accompanying drawings so as to be easily realized by a person having ordinary skill in the art. The exemplary embodiments may be embodied in various forms without being limited to the exemplary embodiments set forth herein. Descriptions of well-known parts are omitted for clarity, and like reference numerals refer to like elements throughout.

Figure 1:
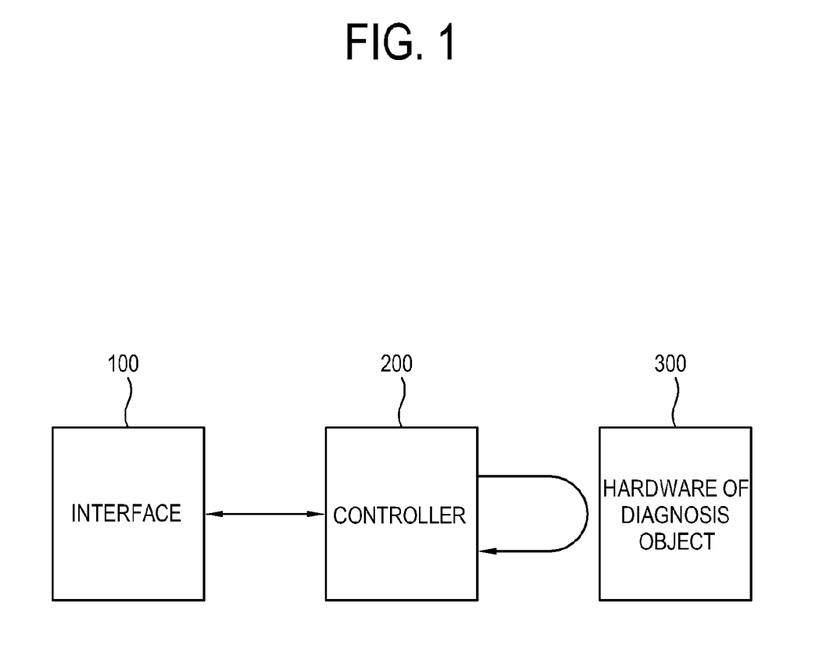
FIG. 1 illustrates an electronic device having a self diagnosis function according to an exemplary embodiment.

FIG. 1 illustrates an electronic device having a self diagnosis function according to an exemplary embodiment. FIG. 1 shows an interface 100 which receives the signal of a user's selection about the hardware of the object to be diagnosed, and a controller 200 which provides a plurality of lines connected to the hardware of the object to be diagnosed with the signal for diagnosis according to a selection signal which is received through the interface 100, and calculates a diagnosis result according to a comparison result obtained by comparing the signal for diagnosis with a return signal which is returned from the hardware of the object to be diagnosed 300 by a loop-back operation. The diagnosis result for the hardware of the object to be diagnosed may be represented as whether at least a line connected to the hardware of the object to be diagnosed is cut off or disconnected, or whether different or adjacent channels have short-circuited each other.

Even though not illustrated in FIG. 1, a display may be added to the electronic device according to an exemplary embodiment in order to receive a control signal from the controller 200 and display the diagnosis result. The diagnosis result may be displayed in a manner that is recognizable by a user. For example, the diagnosis result may be displayed as a text which has a 7-segment shape or variable forms through the display. The diagnosis result may also be expressed as a sound output including an error sound, etc. Therefore a display is a preferable but not a necessary component.

Figure 2:
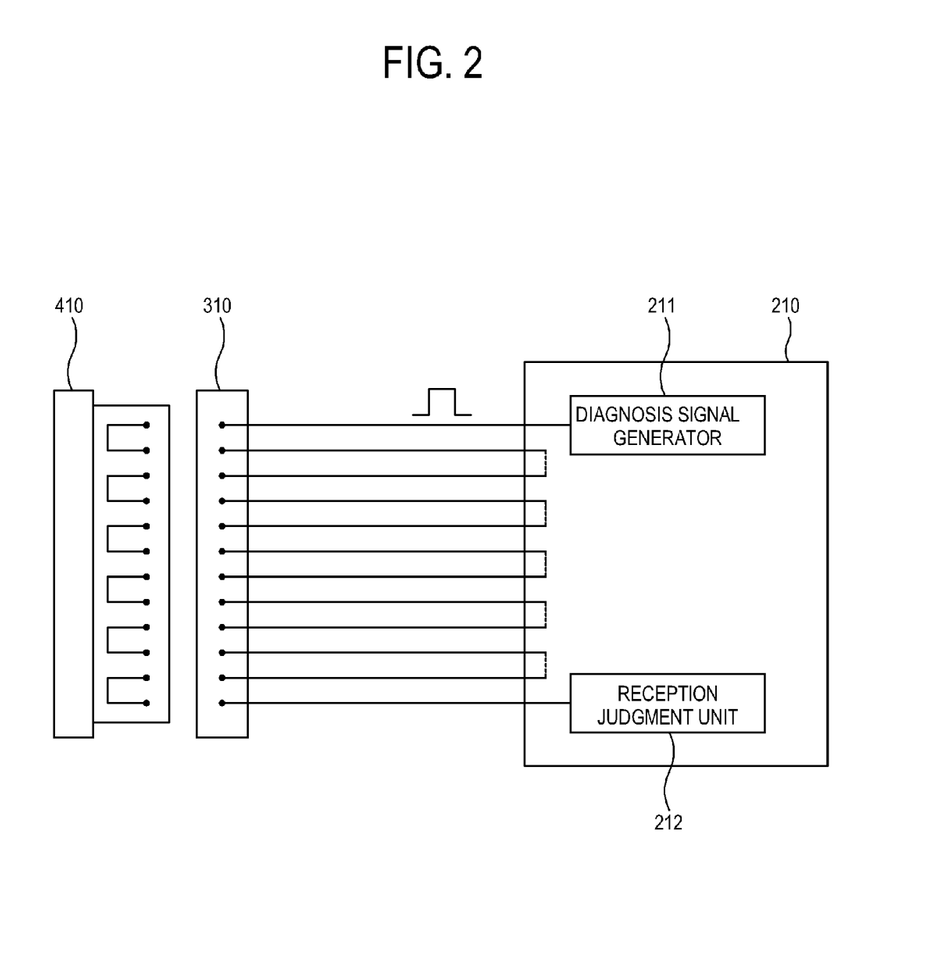
FIG. 2 illustrates the configuration for a self diagnosis execution for a HDMI according to an exemplary embodiment.

FIG. 2 illustrates an electronic device for a self diagnosis operation using HDMI according to an exemplary embodiment. As shown in FIG. 2, a controller 210 may include a diagnosis signal generator 211 and a reception and judgment unit 212. Since the controller 210 is a semiconductor chip, the diagnosis signal generator 211 and the reception and judgment unit 212 may not be hardware components but may be implemented as logic algorithm. The signal transmitted from the diagnosis signal generator 211 is transmitted to a HDMI 310, formed as a loop-back by a cap 410 applying an electric current. The controller 210 inspects the hardware of the object to be diagnosed by forming several or a plurality of loops for inspection of a short-circuit or a disconnection between adjacent components. In addition, the controller 210 may permit different signals according to adjacent components for inspection of a short-circuit or a disconnection between adjacent components. The reception and judgment unit 212 receives a return signal and compares the received return signal to a signal generated from the diagnosis signal generator 211, and judges an abnormality of the HDMI 310 according to a comparison result. The controller 210 is able to inspect whole ports by the loop-back operation not in consecutive order, but simultaneously.

Figure 3:
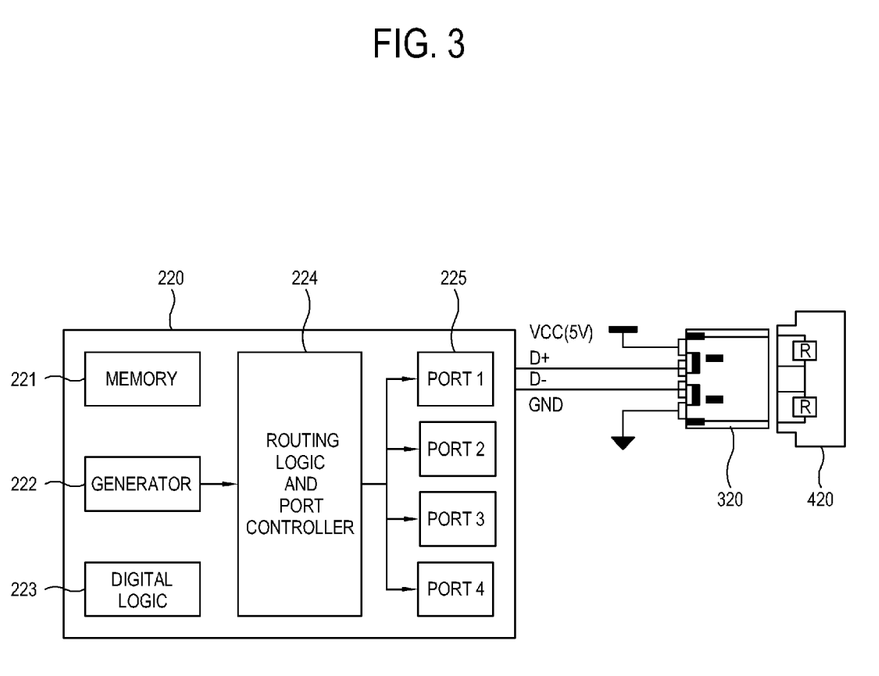
FIG. 3 illustrates the configuration for a self diagnosis execution for a USB interface according to other exemplary embodiment.

FIG. 3 illustrates an electronic device for a self diagnosis using a USB interface according to another exemplary embodiment. According to the exemplary embodiment illustrated in FIG. 3, a first port 225 (Port1) among a plurality of ports (Port1, Port2, Port3, and Port4,) is inspected. The ports are formed at a USB hub 220, which executes a control function. A signal generated from a diagnosis signal generator 222 is transmitted to the port 225 after passing by a routing logic and port controller 224. This signal may be 1 byte, and is saved in a memory 221. This signal is outputted through a D+ terminal of the port 225, and is inputted to a D− terminal of the port 225 through a cap 320 applying an electric current. The cap 320 applying an electric current may form a loop-back circuit. A digital logic unit 223 judges an abnormality of the port 225 by comparing a signal which is received through the D− terminal and passed by the routing logic and port controller 224, to a signal saved in the memory 221.

Figure 4:
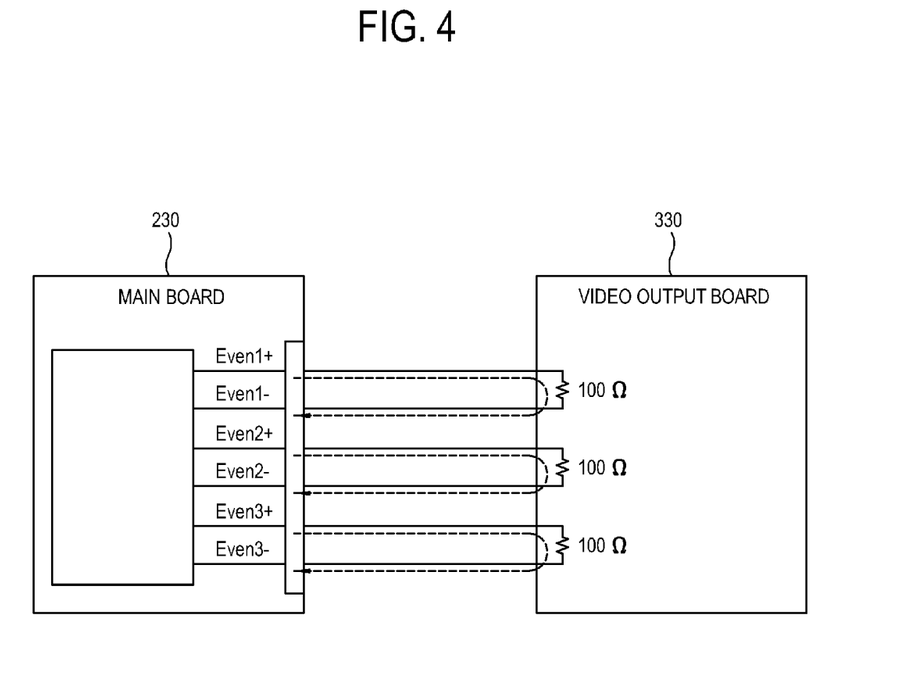
FIG. 4 illustrates the configuration for a self diagnosis execution for a video circuit according to another exemplary embodiment.

FIG. 4 illustrates an electronic device for a self diagnosis of a video circuit according to another exemplary embodiment. As shown in FIG. 4, an impedance matching is used through 100Ω resistor generally between a video main board 230 executing a control function and a video output board 330. A controller 210 may execute a self diagnosis using a resistor for an impedance matching, without using an external device, by applying an internal DC power supply. Namely, the main board 230 of the controller 210 outputs a DC power supply through an Even1+ terminal of the main board 230 and determines a short-circuit or a disconnection by discriminating a voltage at an Even1− terminal of the main board 230 returned by a loop-back through a 100Ω resistor for an impedance matching of the video output board 330.

On the other hand, the controller 210 may discriminate each line and a short-circuit between different or adjacent channels by outputting different voltages to an Even2+ terminal and an Even3+ terminal. Then, different frequencies may be used according to each channel. In other words, the controller 210 may check a disconnection of each of the lines and a short-circuit between adjacent channels by transmitting different DC voltages or different frequencies to each of the lines.

Figure 5:
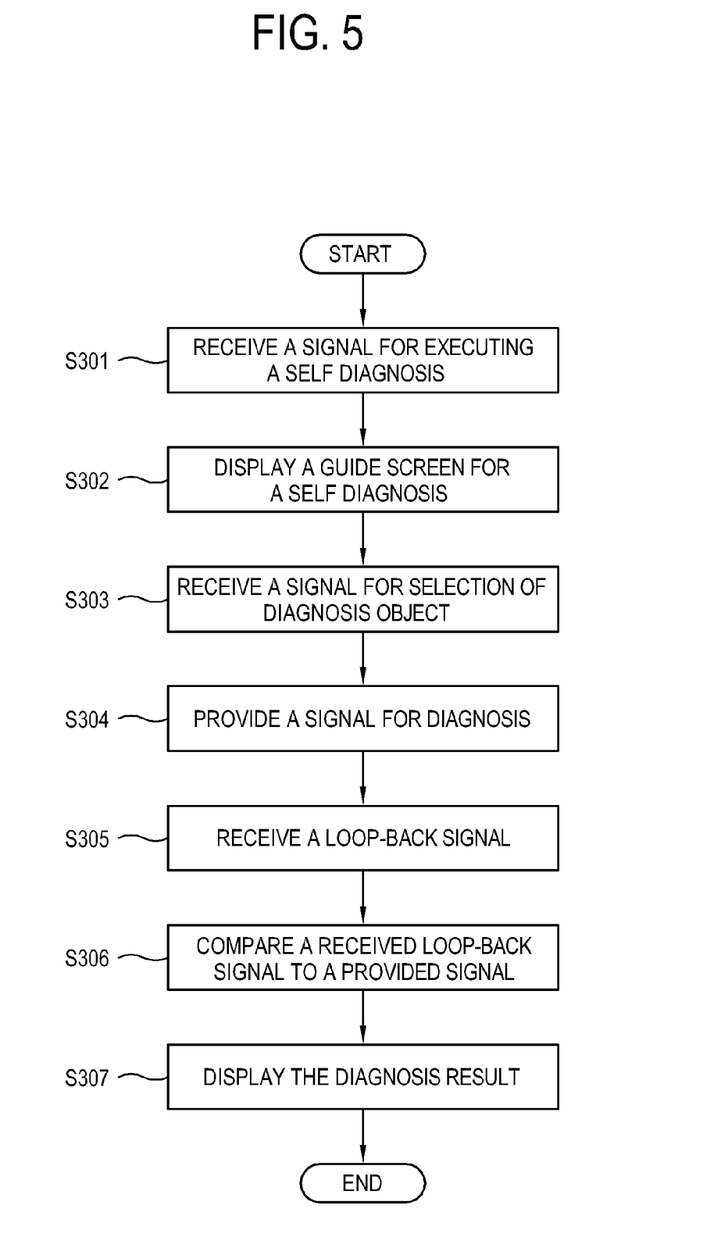
FIG. 5 illustrates a flow chart of a self diagnosis method of an electronic device.

FIG. 5 shows a flow chart of a self diagnosis method of an electronic device. At first, when a manipulation for executing a self diagnosis function is inputted by a user, the input is transmitted to a controller 200 through an interface 100. For example, a user who uses a display apparatus such as a television (TV) or a monitor, may select a function for self diagnosis using a menu button provided in the display apparatus or a remote controller (operation S301).

Figure 6:
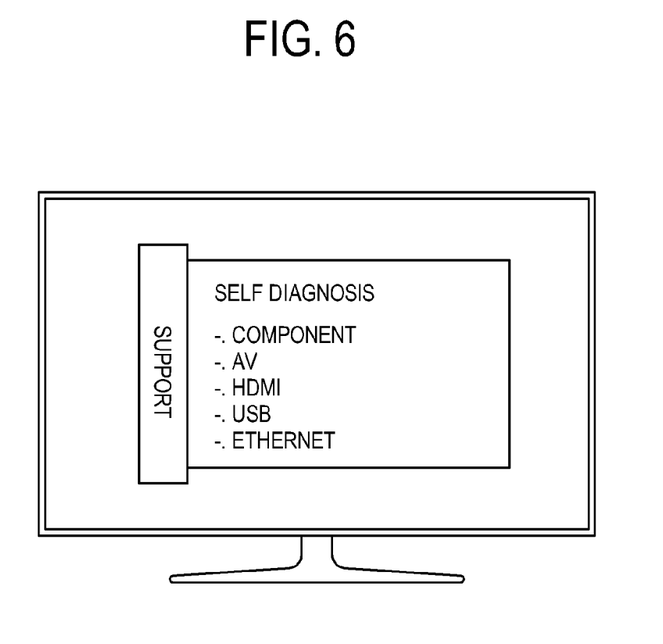
FIG. 6 illustrates the instruction screen for self diagnosis.

The controller 200 may display a guide screen for a self diagnosis operation on a display apparatus, for example, with on screen display (OSD) as shown in FIG. 6. Namely, the controller 200 may display a list of hardware which performs a self diagnosis function. For example, a connector connects an external apparatus to the display apparatus. The connector may be displayed on the display apparatus as a component terminal for a signal from an external component, an audio/video input and output terminal, a high definition multimedia interface (HDMI) terminal, a universal serial bus (USB) terminal to exchange an own signal for a signal of an external apparatus, an Ethernet terminal for connecting the Internet (operation S302).

When a user selects a hardware of the object to be diagnosed through a guide screen in OSD, the controller 200 receives the selection signal about the hardware of the object to be diagnosed. The selection of a user may be executed by various methods. For example, the selection of a user may be executed by a remote controller or a touch panel in the case where a display apparatus has a touch screen. If the electronic device for a self diagnosis according to an exemplary embodiment is a computer, the selection of a user may be executed by a mouse or a keyboard (operation S303).

A signal of the user's selection is transmitted to the controller 200 through the interface 100. The controller 200 provides a plurality of lines connected to the hardware of the object to be diagnosed with a signal for diagnosis. The signal for diagnosis may be a signal with a DC voltage or frequency, and may be transmitted with each different values to the plurality of lines simultaneously (operation S304).

In the next operation, the controller 200 receives a return signal from the hardware of the object to be diagnosed by a loop-back operation (operation S305), and compares the received return signal to the provided signal for diagnosis (operation S306).

Figure 7:
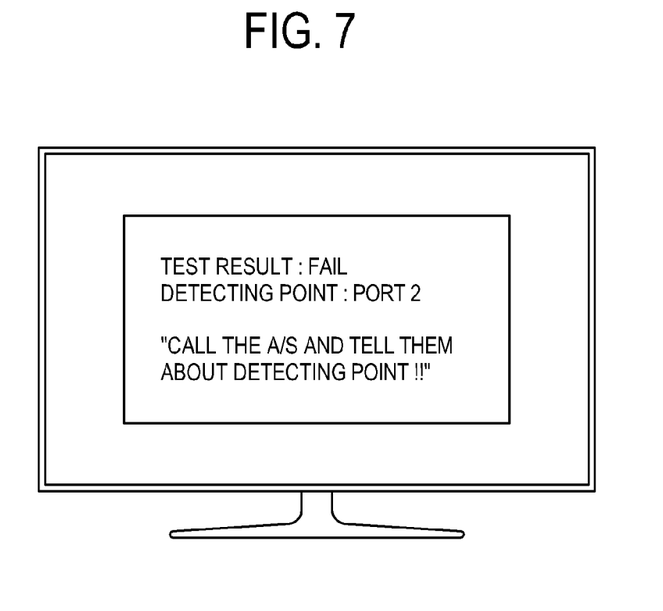
FIG. 7 illustrates the result screen for the self diagnosis.

According to a comparison result, the controller 200 calculates the diagnosis result about the hardware of the object to be diagnosed (operation S307), and outputs the diagnosis result as shown in FIG. 7. Therefore, if a connector has a problem, a user may be provided with a guide explaining how the connector should be repaired (operation S308).

Figure 8:
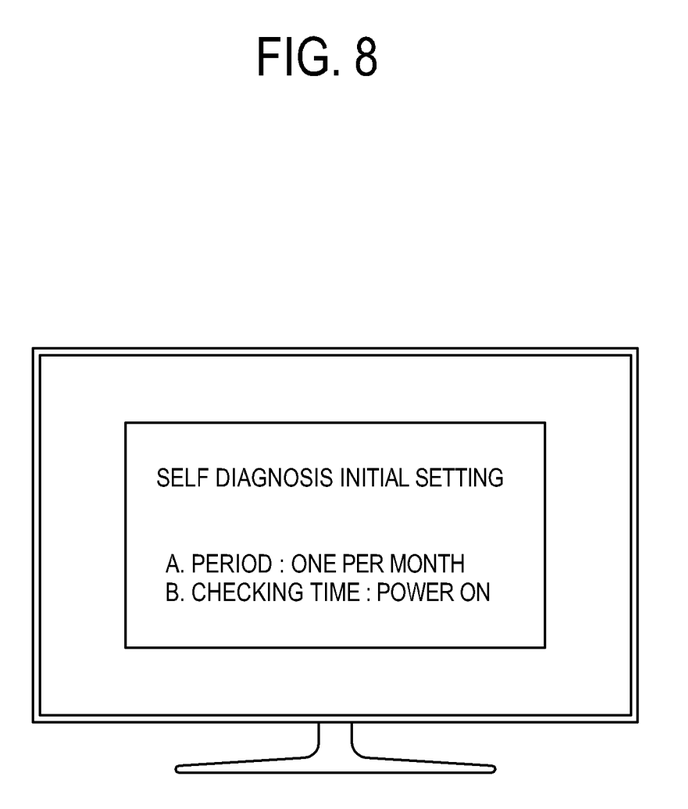
FIG. 8 illustrates the configuration screen for setting the period of self diagnosis.

As shown in FIG. 8, a user may set a period for the diagnosis. For example, a user may set the period for the diagnosis to diagnose the hardware of the object to be diagnosed automatically one time per a month when main power is applied thereto. The period of the diagnosis is set according to the number of usage as the case may be. Then, information of the diagnosis period may be saved in the memory.

Although a few exemplary embodiments have been shown and described, it will be appreciated by those skilled in the art that changes may be made in these exemplary embodiments without departing from the principles and spirit of the exemplary embodiments, the scope of which is defined in the appended claims and their equivalents.

What is claimed is:

1. An electronic device having a self diagnosis function, the electronic device comprising:
    a display;
    an internal component provided in the electronic device;
    one of a first connection component configured to connect with an external device for forming a first loop-back circuit and a second connection component configured to connect with the internal component for forming a second loop-back circuit;
    an interface configured to receive a user input for selecting one of the first connection component and the second connection component of the electronic device to be diagnosed;
    a memory configured to store information on a diagnosis signal comprising one of a first diagnosis signal corresponding to the first loop-back circuit and a second diagnosis signal corresponding to the second loop-back circuit; and
    a controller configured to:
        control the display to display items indicating the first connection component and the second connection component to be diagnosed,
        in response to the user input for selecting one of the first connection component and the second connection component being received through the interface, provide the one of the first diagnosis signal and the second diagnosis signal to a plurality of lines of the selected one of the first connection component and the second connection component,
        receive one of a first return signal and a second return signal which is returned from the selected one of the first connection component and the second connection component respectively, and
        determine one of a disconnection of the first loop-back circuit based on a comparison of the first diagnosis signal and the first return signal and a disconnection of the second loop-back circuit based on a comparison of the second diagnosis signal and the second return signal,
    wherein the provided one of the first diagnosis signal and the second diagnosis signal has one from among a direct current (DC) voltage and an alternating current (AC) voltage that has a frequency, and
    wherein when the provided one of the first diagnosis signal and the second diagnosis signal has an AC voltage, a first line from among the plurality of lines is provided with a first AC voltage that has a first frequency, and a second line from among the plurality of lines is provided with a second AC voltage that has a second frequency which is different from the first frequency.

2. The electronic device according to claim 1, wherein when the provided one of the first diagnosis signal and the second diagnosis signal has the DC voltage, the provided one of the first diagnosis signal and the second diagnosis signal has different DC voltage values for each line of the plurality of lines.

3. The electronic device according to claim 1, wherein the controller shows, on an On Screen Display (OSD), a list of candidate components from which the component to be diagnosed is selectable by a user.

4. The electronic device according to claim 1, wherein the controller provides the lines with the provided one of the first diagnosis signal or the second diagnosis signal simultaneously.

5. The electronic device according to claim 1, further comprising a memory configured to store information that relates to a diagnosis schedule for the selected one of the first component and the second component.

6. The electronic device according to claim 5, wherein the diagnosis schedule is determined by a user.

7. The electronic device according to claim 5, wherein a diagnosis period is set in advance.

8. The electronic device according to claim 1, wherein the first connection component has a port connected to the external device and forms the first loop-back circuit by a using a cap that is configured to apply an electric current.

9. The electronic device according to claim 8, wherein the first connection component is a universal serial bus (USB) interface.

10. The electronic device according to claim 8, wherein the first connection component is a high definition multimedia interface (HDMI).

11. A self diagnosis method for an electronic device, the method comprising:
    displaying an instruction for the self diagnosis on a screen;
    connecting one of a first connection component with an external device for forming a first loop-back circuit and a second connection component with an internal component of the electronic device for forming a second loop-back circuit;
    receiving, from a user, a user input for selecting one of the first connection component and the second connection component of the electronic device to be diagnosed;
    storing, in a memory of the electronic device, information on a diagnosis signal comprising one of a first diagnosis signal corresponding to the first loop-back circuit and a second diagnosis signal corresponding to the second loop-back circuit;
    in response to the receiving the user input for selecting one of the first connection component and the second connection component, providing the diagnosis signal to at least one of a plurality of lines connected to the selected one of the first connection component and the second connection component;

receiving one of a first return signal and a second return signal which is returned from the selected one of the first connection component and the second connection component respectively; and determining one of a disconnection of the first loop-back circuit based on a comparison of the first diagnosis signal and the first return signal and a disconnection of the second loop-back circuit based on a comparison of the second diagnosis signal and the second return signal, wherein the provided diagnosis signal has one from among a direct current (DC) voltage and an alternating current (AC) voltage that has a frequency, and wherein when the provided diagnosis signal has an AC voltage, a first line from among the plurality of lines is provided with a first AC voltage that has a first frequency, and a second line from among the plurality of lines is provided with a second AC voltage that has a second frequency which is different from the first frequency.

12. The method according to claim 11, wherein a result of the determining is displayed on an on screen display (OSD).

13. The method according to claim 11, further comprising saving the provided diagnosis signal.

14. A method for performing self-diagnosis on an electronic device, the method comprising:

selecting, based on a received user input, one of a first connection component and a second connection component of the electronic device to be diagnosed, the first connection component being connected with an external device for forming a first loop-back circuit and the second connection component being connected with an internal component of the electronic device for forming a second loop-back circuit;

storing, in a memory of the electronic device, information on a diagnosis signal comprising one of a first diagnosis signal corresponding to the first loop-back circuit and a second diagnosis signal corresponding to the second loop-back circuit;

in response to the received user input for selecting one of the first connection component and the second connection component, transmitting the diagnosis signal to the selected one of the first connection component and the second connection component;

receiving one of a first return signal and a second return signal which is returned from the selected one of the first connection component and the second connection component respectively; and determining one of a disconnection of the first loop-back circuit based on a comparison of the first diagnosis signal and the first return signal and a disconnection of the second loop-back circuit based on a comparison of the second diagnosis signal and the second return signal, wherein the transmitted diagnosis signal has one from among a direct current (DC) voltage and an alternating current (AC) voltage that has a frequency, and wherein when the transmitted diagnosis signal has an AC voltage, a first channel is provided with a first AC voltage that has a first frequency, and a second channel is provided with a second AC voltage that has a second frequency which is different from the first frequency.

15. The method of claim 14, wherein the first connection component has a port which is connected to the external device.

16. The method of claim 15, wherein the first connection component includes at least one from among a component terminal; an audio/video terminal; a high definition multimedia interface (HDMI); a Universal Serial Bus (USB), and an Ethernet terminal.

17. The method of claim 14, wherein the received one of the first return signal and the second return signal is received based on a loop-back operation.

* * * * *